Patented Sept. 14, 1943

2,329,397

UNITED STATES PATENT OFFICE 2,329,397

UNSATURATED HYDROCARBONS

Edmond L. d'Ouville, Chicago, Ill., and Don R. Carmody, Hammond, Ind., assignors to Standard Oil Company, Chicago, Ill., a corporation of Indiana No Drawing. Application August 17, 1942, Serial No. 455,116

7 Claims. (Cl. 260—666)

The present invention relates to an improved process for preparing unsaturated non-benzenoid hydrocarbons having drying properties and more particularly to the preparation of such from aluminum halide-hydrocarbon complexes.

In the refining of petroleum products many processes involve the use of aluminum halide as catalysts together with various promoters such as hydrogen halide, which may be added as such or produced in situ in the reaction by such added materials as free halogens or alkyl halides. Other promoters may be water, alcohols and the like. When aluminum halide is used as a catalyst in a refining operation of petroleum oils a complex is formed consisting of the aluminum halide and hydrocarbons. These complexes are obtained in such refining and hydrocarbon conversion operations as polymerization, alkylation, isomerization, etc. According to the present invention certain of these complexes may be used for preparing the unsaturated non-benzenoid hydrocarbons having drying properties. Such complexes must be in liquid form and must be prepared from non-benzenoid hydrocarbons such as aliphatic and naphthenic hydrocarbons. Furthermore, they should be derived from those hydrocarbon conversion processes which are carried out at moderate temperatures within the approximate range of from —100° F. to 500° F. For example, a complex may be obtained from an isomerization process which may be carried out in the following manner: The isomerization reaction is preferably carried out in the presence of a promoter which is hydrogen chloride or a halogen-containing compound yielding hydrogen chloride under the reaction conditions. The feed stock consists predominantly of saturated hydrocarbons, including paraffins, isoparaffins, naphthenes or mixtures thereof. Straight-run gasoline or naphtha, preferably substantially aromatic-free, or liquid hydrocarbons from natural gas or distillate wells are suitable fractions. The catalyst, which may be anhydrous aluminum chloride, is present within the range of from about 5% to about 65% by weight of the incoming feed stock and preferably within the range of from about 10% to about 50% by weight. The promoter may be present to the extent of about 0.1% to about 10% by weight of the feed stock, and preferably to the extent of about 1% to about 3%. The reaction is carried out preferably in the presence of hydrogen at a temperature of from about 200 to about 400° F., preferably about 250 to 350° F., and at atmospheric or superatmospheric pressures, for example, from about 0 to about 1500 pounds per square inch gage pressure, or at least under such conditions that the reactants are in the liquid phase. The time of contact can range from about five minutes to about two hours but preferably about one hour, and will depend upon the temperature at which the reaction is carried out as well as the concentration of the catalyst. After the reaction time, the hydrocarbons together with the catalyst and promoter are permitted to settle whereby separation between the hydrocarbons and the catalyst complex takes place. An aluminum chloride-hydrocarbon complex prepared in the above-described manner may be used as a starting material for the purposes of the present invention.

Another complex which may be used according to the present invention may be prepared by treating a hydrocarbon feed containing such hydrocarbons as paraffins, olefins, naphthenes, and the like, at a temperature of from about —100° F. to about 300° F. and preferably from about —40° F. to about 250° F. with a halogen such as chlorine in the presence of a substantial amount of an aluminum halide such as aluminum chloride. In general, the mol ratio of metal halide to halogen consumed lies within the approximate range of 0.5 to 5, but it is preferred to use a mol ratio, $AlCl_3/Cl_2$, of 1.5 to 3.0, while a mol ratio, $AlCl_3/Cl_2$, of about 2 has been found to give particularly good results. There is generally produced a small upper layer comprising unreacted hydrocarbons, polymerized or depolymerized hydrocarbons, isoparaffins, paraffins, and minor amounts of chlorinated hydrocarbons, and a more voluminous lower layer of a heavy oily material which consists of aluminum chloride combined with unsaturated hydrocarbons. This layer constitutes the complex. Upon standing, the complex layer and the lighter hydrocarbon layer separate. The separation of the two layers may be accelerated and rendered more complete by centrifuging and/or washing the complex layer with a light paraffinic naphtha. A complex prepared in the above manner is particularly suitable for use in the present invention, since the final product has particularly good drying properties. A more detailed description of the process for obtaining the last-mentioned complex will be found in application S. N. 436,768, filed by B. H. Shoemaker and E. L. d'Ouville.

Obviously, complexes may be obtained from other hydrocarbon conversion operations wherein an aluminum halide is used as a catalyst, the operating conditions are moderate and wherein the hydrocarbon being converted is a non-benzenoid hydrocarbon. It is also necessary that the spent complex be in liquid form so that it may be treated according to the present invention and hydrolyzed to form an oily layer consisting of unsaturated hydrocarbons and a water layer which contains water-soluble materials and aluminum salts. The oily layer consists of unsaturated hydrocarbons having drying properties which find many uses in connection with paints, varnishes and other coating materials.

According to the known processes for obtaining unsaturated non-benzenoid hydrocarbons by hydrolysis of complexes, the yield of hydrocarbon oil is from about one-half part to about 2 parts by weight for each part of the aluminum halide. According to the present invention we have found that the hydrocarbon content of the complex and consequently the amount of unsaturated hydrocarbon oil per unit amount of aluminum halide may be increased several fold by adding to the complex various liquid and gaseous unsaturated non-benzenoid hydrocarbons having more unsaturation than a monoolefin, such as polyenes, allenes, and acetylenes, and having the formula $$C_xH_{2x-2y}$$

where $y$ has a value of 1 or more, or hydrocarbon mixtures containing such unsaturated hydrocarbons. When a mixture of hydrocarbons is used it is desirable that the content of unsaturated non-benzenoid hydrocarbons having more unsaturation than a monoolefin be greater than 1 to 2% and preferably greater than 5%. When such a mixture is used hydrocarbons with an unsaturation greater than monoolefins react selectively. In some instances it has been found that not only is the yield increased but also the drying properties of the unsaturated hydrocarbon oil are greatly improved by this treatment. This is particularly true when a highly unsaturated compound such as acetylene is added to the complex before hydrolysis. According to the present invention the yield is increased by amounts which may be up to about seven parts of oil or more for each part of aluminum halide.

The complex with the increased hydrocarbon content may be washed or extracted before hydrolysis with paraffinic hydrocarbons to remove traces of uncombined hydrocarbons. Or the same result can often be effected by sweeping the warm complex with an inert gas such as $N_2$, $CH_4$ or dry air.

While the explanation for these unexpected results is not entirely clear it is believed that when the spent aluminum halide-hydrocarbon complex is treated with various unsaturated gaseous or liquid hydrocarbons having more unsaturation than the monoolefins, such as acetylenes, diolefins, terpenes and the like, that the added unsaturated hydrocarbons combine in some manner with the complex due to some residual activity of the aluminum halide.

In practicing the present invention the treatment of the aluminum halide-hydrocarbon complex is carried out at temperatures of from about 30° F. to about 250° F. for periods or from about two minutes to several hours. When treating with gaseous hydrocarbons having more unsaturation than monoolefins, the gas may be passed directly into the complex while the liquid hydrocarbons need only to be added to the complex and agitated. It has been found that the weight of the complexes may be increased from 1% to several hundred per cent by weight and that the quantity of unsaturated oil obtained by hydrolysis is greatly increased.

As a particular example of the foregoing a complex was obtained by treating an excess of isooctane with 100 parts by weight of aluminum chloride in the presence of HCl at 150° F. for about 10 hours. A portion of the complex was then treated by passing acetylene directly into the complex at room temperature until the weight of the complex had increased about 30%. This product was hydrolyzed and the layers permitted to separate. The oily layer was then extracted with benzene and the benzene removed by distillation. The final product was then mixed with a volatile solvent and spread in a thin layer on a glass plate. A hard dry film was formed in about twelve hours. The product obtained by merely hydrolyzing the complex without the acetylene treatment did not dry completely even after twenty-four hours.

In another case 46 grams of the aluminum chloride-isooctane complex referred to in the preceding paragraph was treated with 21 grams of turpentine at about 50° F. for about five minutes. The yield of unsaturated hydrocarbon oil was doubled as compared with the yield obtained by merely hydrolyzing the $AlCl_3$ isooctane complex.

By way of comparison 328 grams of turpentine were added to 94 grams of the same complex and the mixture maintained at about 200° F. for about an hour. The resulting 422 grams of complex were hydrolyzed and the yield of unsaturated oil was about 6.5 pounds per pound of aluminum chloride or, in other words, about thirteen times that obtained when the complex was hydrolyzed without the turpentine treatment.

The above mentioned examples are tabulated in the table below:

|  | Example | | |
|---|---|---|---|
|  | A | B | C |
| *Charge* | | | |
| $AlCl_3$_____grams__ | 100 | | |
| Hydrocarbon_____ | Iso-octane Excess | Turpentine 21 | Turpentine 328 |
| HCl_____grams__ | | (¹) | (¹) |
| $AlCl_3$-complex_____ | | | |
| $AlCl_3$-complex__grams__ | | 46 | 94 |
| Activator_____ | HCl | | |
| *Conditions* | | | |
| Temperature_____° F__ | 150 | 80+ | 200 |
| Time_____hours__ | 10 | 0.1 | 1.0 |
| *Products* | | | |
| Complex_____grams__ | 150 | 67 | 422 |
| Upper layer_____ | | | None |
| Condensibles_____ | | | None |
| HX_____grams__ | | | Trace |
| *Drying oil* | | | |
| Yield, lbs./$AlCl_3$_____ | 0.5 | 1.1 | 6.5 |
| $N^{20}_D$_____ | 1.5120 | | 1.5232 |
| Drying rate ²_____ | Good | Excellent | Moderate |
| Color_____ | Fair | Good | Good |

¹ Iso-octane complex from A.
² The drying rate tests were made using boiled linseed oil as a reference. In the three cases cited above the time necessary for films to become tack free varied from 0.1 to 0.5 of the time required for boiled linseed oil to become tack free under identical conditions.

Various modifications of the examples of the present invention will be apparent to those skilled in the art and it is intended that such modifications should be included within the scope of the present invention.

Although the invention has been described with reference to several specific examples it is intended that they shall not be construed as limiting the invention. The scope of the present invention is to be defined solely by the claims appended hereto.

We claim:

1. An improved process for producing an unsaturated non-benzenoid hydrocarbon product having drying properties comprising treating an aluminum halide non-benzenoid hydrocarbon complex with at least one non-benzenoid hydrocarbon having more unsaturation than a monoolefin to increase the hydrocarbon content of said complex and hydrolyzing the treated complex to produce the unsaturated non-benzenoid hydrocarbon product.

2. An improved process for producing an unsaturated non-benzenoid hydrocarbon product having drying properties comprising treating an aluminum halide non-benzenoid hydrocarbon complex with a polyene to increase the hydrocarbon content of said complex and hydrolyzing the treated complex to produce the unsaturated non-benzenoid hydrocarbon product.

3. An improved process for producing an unsaturated non-benzenoid hydrocarbon product having drying properties comprising treating an aluminum halide non-benzenoid hydrocarbon complex with a terpene to increase the hydrocarbon content of said complex and hydrolyzing the treated complex to produce the unsaturated non-benzenoid hydrocarbon product.

4. An improved process for producing an unsaturated non-benzenoid hydrocarbon product having drying properties comprising treating an aluminum halide non-benzenoid hydrocarbon complex with an acetylene to increase the hydrocarbon content of said complex and hydrolyzing the treated complex to produce the unsaturated non-benzenoid hydrocarbon product.

5. A process as claimed in claim 1 wherein the aluminum halide non-benzenoid hydrocarbon complex is an aluminum chloride non-benzenoid hydrocarbon complex.

6. A process as claimed in claim 1 wherein the aluminum halide non-benzenoid hydrocarbon complex is selected from the class consisting of complexes resulting from the polymerization of non-benzenoid hydrocarbon in the presence of aluminum chloride, the alkylation of non-benzenoid hydrocarbon in the presence of aluminum chloride, the isomerization of non-benzenoid hydrocarbons in the presence of aluminum chloride, and the production of alkyl halide from hydrogen halides and olefins in the presence of aluminum chloride.

7. A process for the production of mixed unsaturated hydrocarbons having drying properties which comprises contacting a feed stock comprising non-benzenoid hydrocarbons with a conversion agent comprising aluminum halide at a temperature within the approximate range of from $-100°$ F. to $500°$ F. whereby a primary aluminum halide-hydrocarbon-containing complex is formed, subsequently reacting said aluminum halide-hydrocarbon complex with a second feed stock comprising non-benzenoid hydrocarbons having an empirical formula of $$C_xH_{2x-2y}$$

where $y$ has the value of one or more at a temperature in the range of from about $-100°$ F. to about $500°$ F. to form an increased quantity of secondary aluminum halide-hydrocarbon complex, separating any remaining hydrocarbons from the said secondary complex, hydrolyzing said second complex and washing said complex to remove any free acidity.

EDMOND L. D'OUVILLE.
DON R. CARMODY.